UNITED STATES PATENT OFFICE.

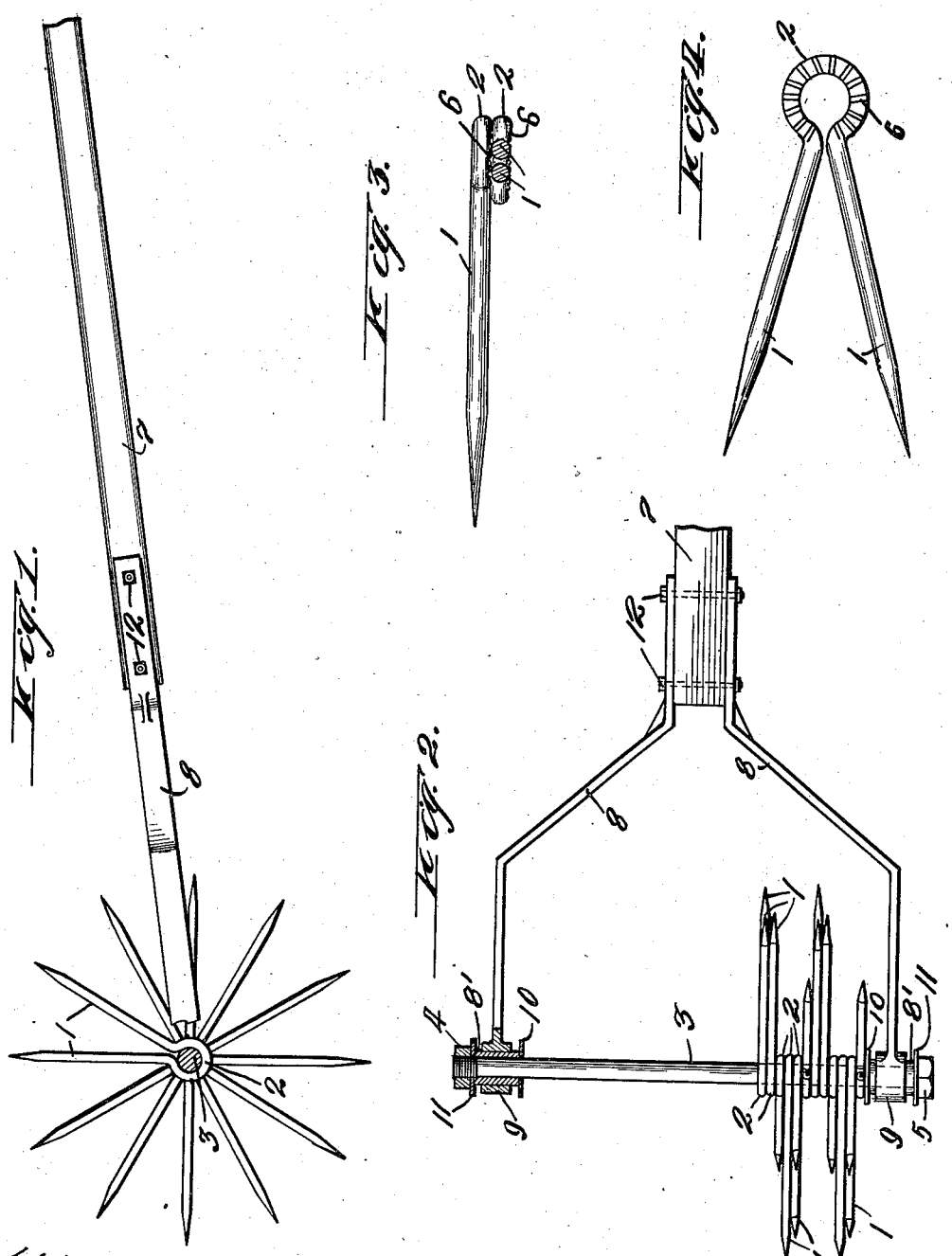

ELBERT J. BROOKS, OF SPARTA, WISCONSIN.

HAND-CULTIVATOR.

1,014,045.  Specification of Letters Patent.  Patented Jan. 9, 1912.

Application filed April 3, 1911. Serial No. 618,505.

*To all whom it may concern:*

Be it known that I, ELBERT J. BROOKS, a citizen of the United States, residing at Sparta, county of Monroe, and State of Wisconsin, have invented new and useful Improvements in Hand-Cultivators, of which the following is a specification.

My invention relates to improvements in hand cultivators, and it pertains more especially, 1st. To the construction of the bifurcated teeth which are adapted to penetrate and stir up the surface of the soil over which the device is operated. 2nd. To a device for rigidly clamping a plurality of such teeth together upon a revoluble shaft, and 3rd. To a device for supporting said shaft and the radial teeth thereon from the respective arms of an operating handle.

My invention is further explained by reference to the accompanying drawings in which—

Figure 1 represents a side view thereof, part of one of the supporting side arms of the handle being removed. Fig. 2 is a plan view part in section, some of the radial teeth being removed. Fig. 3 represents a side view of one of the teeth complete, and a part of another tooth, showing the corrugated opposing surfaces by which said teeth are more rigidly clamped together, and Fig. 4 represents a plan view of one of the bifurcated teeth removed from its supporting shaft.

Like parts are identified by the same reference numerals throughout the several views.

Each tooth comprises two bifurcated pointed members 1, centrally connected together by the circular member 2, and said teeth are adapted to be clamped together upon the supporting shaft 3 by the clamping nut 4 and fixed head or nut 5. The bifurcated teeth are preferably provided upon their opposing clamping surfaces with corrugations 6 by which the liability of said teeth slipping out of place, is lessened.

7 represents the handle by which the cultivator is operated. The handle 7 is provided upon its respective sides with arms 8 with which the shaft 3 and teeth supported thereon, are connected. The shaft 3 is provided at its respective ends with clamping collars 8', which clamping collars are revolubly supported in the journal bearings 9 of the side arms, and said collars are adapted, as the nut 4 is turned down on the shaft 3, to bear against the opposing sides of the series of bifurcated teeth 1, whereby said teeth are securely clamped in contact with each other and rigidly secured to their supporting shaft 3. The collars 8 are adapted to revolve freely in the journal bearings 9, while they serve to rigidly clamp said teeth together, as stated. A pair of washers 10 are preferably interposed between the opposing ends of said collars 8, and the series of teeth, and I also preferably interpose a pair of washers 11 between the clamping members 4 and 5 and the opposing ends of said sleeves, as said washers 11 are of greater diameter than the journal bearings 9, they prevent the shaft 3 from being withdrawn from such journal bearings. The side arms 8 are secured to the handles 7 by the retaining bolts 12, or in any other convenient manner. The pointed ends of the bifurcated teeth 1 are adapted, as the cultivator is pushed forwardly, to penetrate the surface, while by their revolving movement, they are adapted to elevate and loosen up the soil over which the cultivator is operated.

Having thus described my invention, what I claim as new, and desire to secure by Letters Patent, is—

1. In a device of the described class, the combination of a shaft, a plurality of bifurcated teeth each tooth comprising two pointed members diverging oppositely from each other, centrally connected together by an annular member which surrounds and is supported directly upon said shaft, means for clamping the central member of said teeth together and directly around said shaft, an operating handle, and means for revolubly supporting said shaft from said handle.

2. In a device of the described class, the combination of a shaft, a plurality of bifurcated teeth centrally connected together by an annular member which annular member surrounds and is supported directly from said shaft, a pair of clamping sleeves carried by said shaft located upon the respective sides of said teeth, a stationary bearing connected with one end of said shaft and a nut threaded upon the opposite end of said shaft, said nut being adapted as it is turned down thereon, to force said collars against the central connecting members of said teeth, whereby said teeth are clamped together and rigidly secured to said shaft, an operating handle, shaft supporting arms connected at one end to said handle and provided at their opposite ends with journal bearings for the reception of the ends of said shaft.

3. In a device of the described class, the combination of a shaft, a plurality of bifurcated teeth supported on said shaft, a pair of clamping sleeves carried by said shaft located upon the respective sides of said teeth, a fixed bearing connected with said shaft upon one side of said teeth, a nut threaded upon the opposite end of said shaft adapted as it is turned down thereon, to force said collars against said teeth, whereby said teeth are clamped together upon said shaft, an operating handle, shaft supporting arms connected at one end to said handle and provided at their opposite ends with journal bearings for the reception of the ends of said shaft, and a pair of washers secured to said shaft outside of said journal bearings between the outer ends of said collars and the opposing surfaces of said nut, and fixed bearing, all substantially as and for the purpose specified.

In testimony whereof I affix my signature in the presence of two witnesses.

ELBERT J. BROOKS.

Witnesses:
R. A. RICHARDS,
JULIA HEILMANN.

---

Copies of this patent may be obtained for five cents each, by addressing the "Commissioner of Patents, Washington, D. C."